Figure 1:
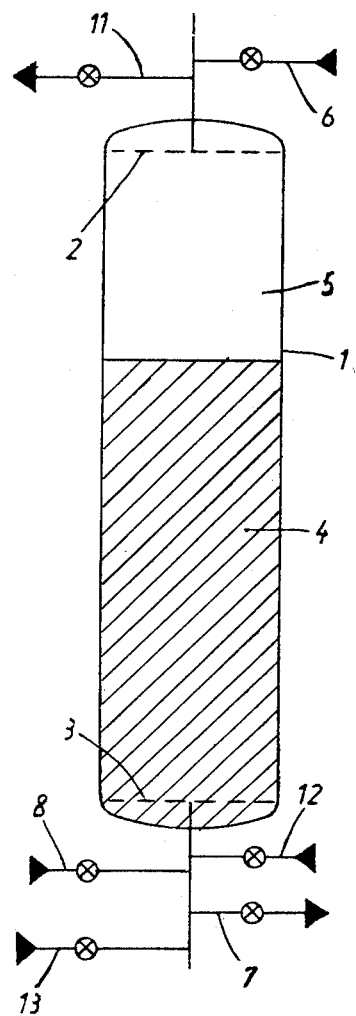

United States Patent [19]

Evans

[11] 4,230,807
[45] Oct. 28, 1980

[54] METHOD FOR REGENERATING A WEAK BASE ANION EXCHANGER

[75] Inventor: Sheldon Evans, Overveen, Netherlands

[73] Assignee: Hoogovens Ijmuiden, B.V., IJmuiden, Netherlands

[21] Appl. No.: 703,814

[22] Filed: Jul. 9, 1976

[30] Foreign Application Priority Data

Jul. 9, 1975 [DE] Fed. Rep. of Germany ....... 2530677

[51] Int. Cl.² ............................................. B01D 15/06
[52] U.S. Cl. ...................................... 521/26; 210/673
[58] Field of Search .................. 210/32, 34, 35, 30 R, 210/24 R, 37 R; 521/26

[56] References Cited

U.S. PATENT DOCUMENTS

| 2,599,558 | 6/1952 | Juda | 210/35 |
| 2,917,368 | 12/1959 | Juda | 210/24 |
| 3,429,835 | 2/1969 | Odland | 210/32 |
| 3,455,819 | 7/1969 | Crits | 210/32 |
| 3,458,436 | 7/1969 | Martinola et al. | 210/35 |
| 3,501,401 | 3/1970 | Calmon | 210/37 R |
| 3,709,818 | 1/1973 | Gustafson | 210/37 R |

*Primary Examiner*—Benoit Castel
*Attorney, Agent, or Firm*—Stevens, Davis, Miller & Mosher

[57] ABSTRACT

A method for regenerating a weak base anion exchanger which comprises passing a regenerating chemical in an upward direction through a granular resinous mass of an exchanger, thereupon displacing the chemical and rinsing the mass with water. The regenerating chemical is a lime slurry having a concentration of 1 to 5% by weight, which is both supplied to and withdrawn from the granular mass in an evenly distributed flow with a flow rate of at least 10 m³, per hour, per m³ resin material (m³/h/m³), while the granular mass is in a compacted state.

8 Claims, 2 Drawing Figures

U.S. Patent    Oct. 28, 1980    4,230,807

METHOD FOR REGENERATING A WEAK BASE ANION EXCHANGER

The invention relates to a method for regenerating a weak base anion exchanger which comprises passing a regenerating chemical in upward direction through a granular resinous mass of such exchanger, thereupon displacing that chemical and rinsing the mass with water. In accordance with the present state of the art, caustic soda, or soda ash, or ammonia, are used to regenerate weak base anion exchangers. The high costs of the above mentioned chemical regenerants that are required for the cyclical operation of ion exchangers are reflected in the high operation costs for such systems. The substitution of lime slurry, which on a cost per equivalent basis, is between 4 and 9 times less expensive than the above mentioned chemicals, should result in significant savings in operational costs.

Previous attempts to utilize lime as a regenerant for weak base ion exchangers have, however, not met with success. The problems encountered included the following: the formation within the exchanger bed of precipitates such as magnesium hydroxide, calcium sulfate, calcium carbonate, effectively plugged up the bed and restricted further flow; lime interacted with the weak base anion exchanger to form a cake through which flow was restricted; and the formation above the resin bed of precipitates that were difficult to separate from the exchanger bed. All of the above mentioned problems given rise to excessive pressure drops and additionally prevent effective regeneration from taking place.

A further drawback in using lime as a regenerant was found in the phenomenon that the capacity of the weak base resin deteriorated with each successive cycle due to the buildup of precipitate within the exchanger bed. Although this might be solved by using a pretreated water to prepare a 0,1% lime solution, the volumetric requirement for regenerant may then become some 40% of the volume of water treated per cycle. This approach is not practical in that a large percentage of product water is diverted to regenerant preparation, and further this large volume would represent a significantly greater waste disposal problem than that associated with the more conventional regenerants. Typically, with caustic regenerant, a 4% solution is used. Thus in the regeneration of a given weak base exchanger the water required to prepare a 0,1% lime solution is about 40 times greater then that required for the preparation of a 4% caustic soda solution.

It is a further object of the invention to reduce the investment costs for apparatus for regenerating a weak base anion exchanger, whereas it is still another object of the invention to shorten the time which is needed for the regeneration.

It is an object of the invention to eliminate all the above described drawbacks and to present a new method which offers still further advantages to be described later on.

The invention is characterized in that in the method of the type described as known, as a regenerating chemical a lime slurry is used having a concentration of 1 to 5% by weight, which is both supplied to and withdrawn from the granular mass in an evenly distributed flow with a flow rate of at least 10 m³ per hour per m³ resin material (m³/h/m³), while said granular mass is in a compacted state, and in that as an anion exchanger a weakly basic resin is selected of the macroporous type. Especially good results were obtained according to the invention if the lime slurry has a concentration of about 4% by weight, and if it is passed through the granular mass at a flow rate of between 20 and 40 m³/h/m³, and that an anion exchanger is selected of a type having low interaction with lime to form precipitates and having fast regeneration kinetics adapted to the lime concentration and the flow rate.

The invention presents a simple solution by dropping conventional principles that include, provisions to maintain a compact bed on the bottom of the vessel, provisions to keep the bed either partically expanded or fluidized, and that regeneration flow rates be of the order of 2 to 4 m³ of regenerant per hour per m³ of ion exchange material (m³/h/m³).

The lime slurry is introduced at a sufficiently high flow rate that precludes the formation of growth of such precipitates that if present would result in clogging and in high pressure drops. It is essential for the new process that the weak base anion exchanger selected does not interact with lime solution so as to form a cake or precipitate within the exchanger bed and further that the regeneration kinetics be sufficiently fast so that effective regenertion occurs at such high rates. It was found that most conventional gel-type resins were unsatisfactory for the new process. It also was found that many of the macroporous-type weakly basic resins were eminently suited to the new process.

It is essential for the new process that adequate distribution systems are provided at both the top- and bottom-ends of the vessel consistent with maintaining the high regenerant flow rate and in order that as low as possible pressure drop is obtained. Any serious deviations from the high regeneration flow rates will enhance the formation and growth of undesirable precipitates and will result in high pressure drops as well as clogging.

The high regeneration flow rate of the invention results in compacting the resin bed against the distributors at the top-end of the vessel. The required reaction is then occuring in a compact bed. At such high flow rates this compaction will generally occur with the conventionally used free space of 100%.

Because of the improved distribution of the lime slurry through a compacted bed of the granular mass it was found to be possible, and even advantageous that the granular mass is contained in a vessel having a free space of less than 50% of the space occupied by the granular mass. Better economics are obtained in this respect if said free space is selected between 30 to 40% of the space filled with the granular mass.

In known processes involving ion exchange it was found necessary for effective rinsing and/or backwashing to provide a free space of approximately 100%. Because of the described way of regeneration, but also because of a different method of rinsing, still to be described, it was found that effective rinsing may be obtained with such small free spaces. It will be clear that this reduction in rinsing space results in capital economy, lowering the total volume of unit to be rinsed, and in a more rapid removal of unwanted solid materials. The capital economy is achieved by increasing the quantity of product per unit vessel, which may for instance result in approximately 50% increase in bed depth by reducing the free space from 100 to 30%. It will be clear that an increase in bed depth in a vessel directly results in increasing the capacity of the vessel.

According to the invention the lime slurry after regeneration is displaced by an upward flow of water at a similar flow rate as of the slurry regeneration. This results in that the granular mass remains compacted at the top-end of the vessel. According to the invention the rinsing of the granular mass, however, is performed by an upward flow of water while the granular mass is completely expanded. A further improvement may, according to the invention, be obtained by introducing air simultaneously with the rinsing water during the rinsing action.

Whereas conventionally the time required for regenerant introduction is between 20 and 60 minutes, in the new method the required time may be reduced to a few minutes. The displacement of the regenerant is undertaken simultaneous with the end of the regeneration so that the bed does not decompact.

In the new process the purpose of the rinse is to clean the resin bed as well as to stratify the exchanger particles. This cleaning involves the removal of fine precipitatious material, mostly $CaCO_3$. It will be clear that this rate is dependent on the amount of free space in the vessel.

Favourable results were obtained according to the invention if displacing of the lime slurry is performed with between 1 and 2 $m^3$ water per $m^3$ resin, and in which rinsing is done with about 4 $m^3$ water per $m^3$ resin. In practice this means that if product water is used for displacing the lime slurry and for rinsing the resin, only about 6% of such product water produced by the installation itself is needed for complete cleaning of the granular mass after regeneration. It is clear that said percentage depends on the quality of the feed water, such quality determines the volume of product water for a given cycle. It is to be noted, however, that instead of product water also feed water may be used for rinsing purposes which may further increase the efficiency of the process.

In order to obtain a very even flow of lime slurry and rinsing water through the vessel according to the invention distributing systems at the top- and bottom- ends of the vessel may be used, provided with openings such that they prevent the passage of the granules.

EXAMPLE

Figure 2:
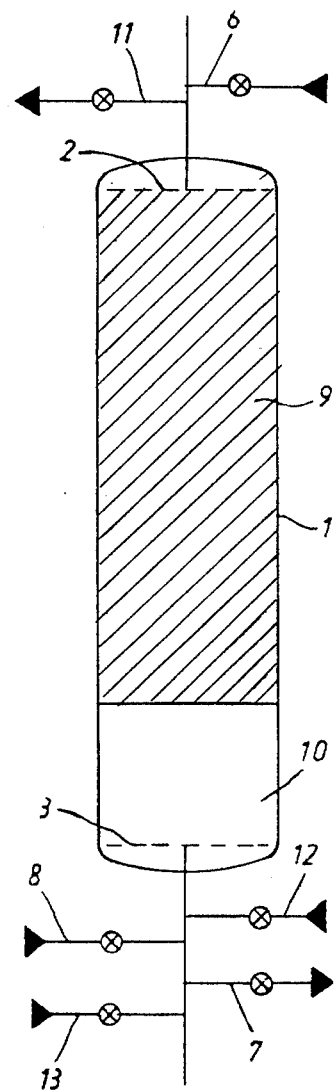

The invention will be illustrated by one simple example, described with reference to the accompanying drawing, in which FIGS. 1 and 2 are diagrammatic illustrations of a vessel 1 forming part of an ion exchange installation for demineralization of brackish water (not shown). Two nozzle plates 2 and 3 are provided at top- and bottom ends as distributing systems. The nozzles have a slit of 0,2 mm. Each nozzle plate contains 74 nozzles per $m^2$ of cross sectional area. The distance between nozzle plates 2 and 3 is 2.1 meters. Vessel 1 contains a weak base anion exchanger of the well-known type Amberlite IRA-94S, traded by the Rohm & Hass company, at a bed depth of 1.5 meters so that there was 40% free space in vessel 1.

The arrangement of the vessel 1 during the service or demineralization run is shown in FIG. 1. The feed water which in this instance is the effluent from a vessel that contains a strong acid cation exchanger, is passed downflow such that its path is traced successively by:

Inlet 6, distributor system 2, free space 5, weak base anion exchanger bed 4, distributor system 3 and service outlet 7. The brackish water feed contains 8 meq./liter TDS (Total Dissolved Solids) and a passed down flow at a rate of 20 $m^3/h/m^3$ during a service run of 5 shows. Analyses of the feed and product waters were:

| Ion | Concentration, ppm | |
|---|---|---|
| | Feed water | Product water |
| $CA^{++}$ | 60 | 0 |
| $Mg^{++}$ | 10 | 0 |
| $Na^+$ | 95 | 7 |
| $Cl^-$ | 180 | 5 |
| $SO_4=$ | 100 | 0 |
| $NO_3^-$ | 32 | 0 |

The characteristics of the same vessel 1 during upflow regeneration with a 4% lime slurry are shown in FIG. 2. A 4% lime slurry is introduced via conduit 8 and distributor system 3 at a rate of 25 $m^3/h/m^3$ during 2 minutes. The resin bed compacts from the top down as bed 9 within about 30 seconds. The flow path of the slurry can be traced by:

conduit 8, distributor system 3, free space 10, compact bed 9, distributor system 2, and outlet 11. The regeneration is carried out using 34 grams of calcium hydroxide per liter of anion exchanger material. For this example a slurry pump was used to introduce the 4% lime slurry. Alternatively a strong lime slurry (35%) can be diluted in an ejector system, or the 4% lime slurry can be prepared with the solid lime in an ejector system. The displacement begins simultaneously with the end of the regeneration with 1.5 $m^3$ of water per $m^3$ of exchanger material at a rate of 20 $m^3/h/m^3$. The flow path is identical to that described under regeneration.

The rinse is accomplished by introducing air via conduit 12 and product water at conduit 13 simultaneously such that the water passes upflow at a rate of 10 $m^3/h/m^3$. Compaction of the bed is prevented. The resin becomes effectively cleaned using 4 $m^3$ of product water per $m^3$ of exchanger material. At this point the air blow is stopped and the upflow rinse is continued until the vessel is filled with water.

Upon completion of the upward rinse, the bed is allowed to fall to the bottom, whereupon stratification in terms of particle size may be observed. A conventional downward rinse with cation water (from cation exchanger bed) is then followed by the next service run.

100 cycles (cycle=service run+regeneration) were carried out in accordance with the new method. There was no fall off in product water volume or quality during this period.

The utilization of weak base anion exchanger beds is well known to those familiar with the state of the art. Such weak base exchanger beds may be used singly or in various combinations with other beds that include, weak acid cation exchangers, strong acid cation exchangers, and strong base anion exchangers. The new process can be utilized singly or with any of the above mentioned combinations. Such systems are used in technical applications that include, separation processes, desalination, demineralization, organics removal, treatment of plating wastes, and nitrate and phosphate removal.

I claim:

1. A method for regenerating a weak base anion exchanger which comprises passing a regenerating chemical in an upward direction through a granular resinous mass of such exchanger, thereupon displacing said chemical and rinsing the mass with water, said regenerating chemical being a lime slurry having a concentration of 1 to 5% by weight, which is both supplied to and withdrawn from the granular mass in an evenly distributed flow with a flow rate of at least 10 m³, per hour, per m³ resin material (m³/h/m³), while said granular mass is in a compacted state.

2. The method of claim 1, characterized in that the lime slurry has a concentration of about 4% by weight, and that it is passed through the granular mass at a flow rate between 20 and 40 m³/h/m³, said anion exchanger being substantially not reactive with lime to form precipitates and having fast regeneration kinetics adapted to the lime concentration and the flow rate, especially those of the macroporous type.

3. The method of claim 1, wherein said granular mass is contained in a vessel having a free space of less than 50% of the space occupied by the granular mass.

4. The method of claim 3, in which said free space is selected between 30 to 40% of the space filled with the granular mass.

5. The method of claim 1, wherein the lime slurry after regeneration is displaced by an upward flow of water at a similar flow rate to that of the lime slurry.

6. The method of claim 1, wherein said rinsing of the granular mass is performed by an upward flow of water while the granular mass is completely expanded.

7. The method of claim 6, including introducing air simultaneously with the rinsing water.

8. The method of claim 1, wherein the granular mass is contained inside a vessel between distributing systems at the top- and bottom-ends of the vessel, provided with openings such that they prevent the passage of the granules.

* * * * *